No. 736,240. PATENTED AUG. 11, 1903.
W. ERBEN & J. A. McK. WASS.
APPARATUS FOR SEPARATING VOLATILE LIQUID FROM LIQUID CONTAINING SAME.
APPLICATION FILED SEPT. 21, 1901.
NO MODEL.
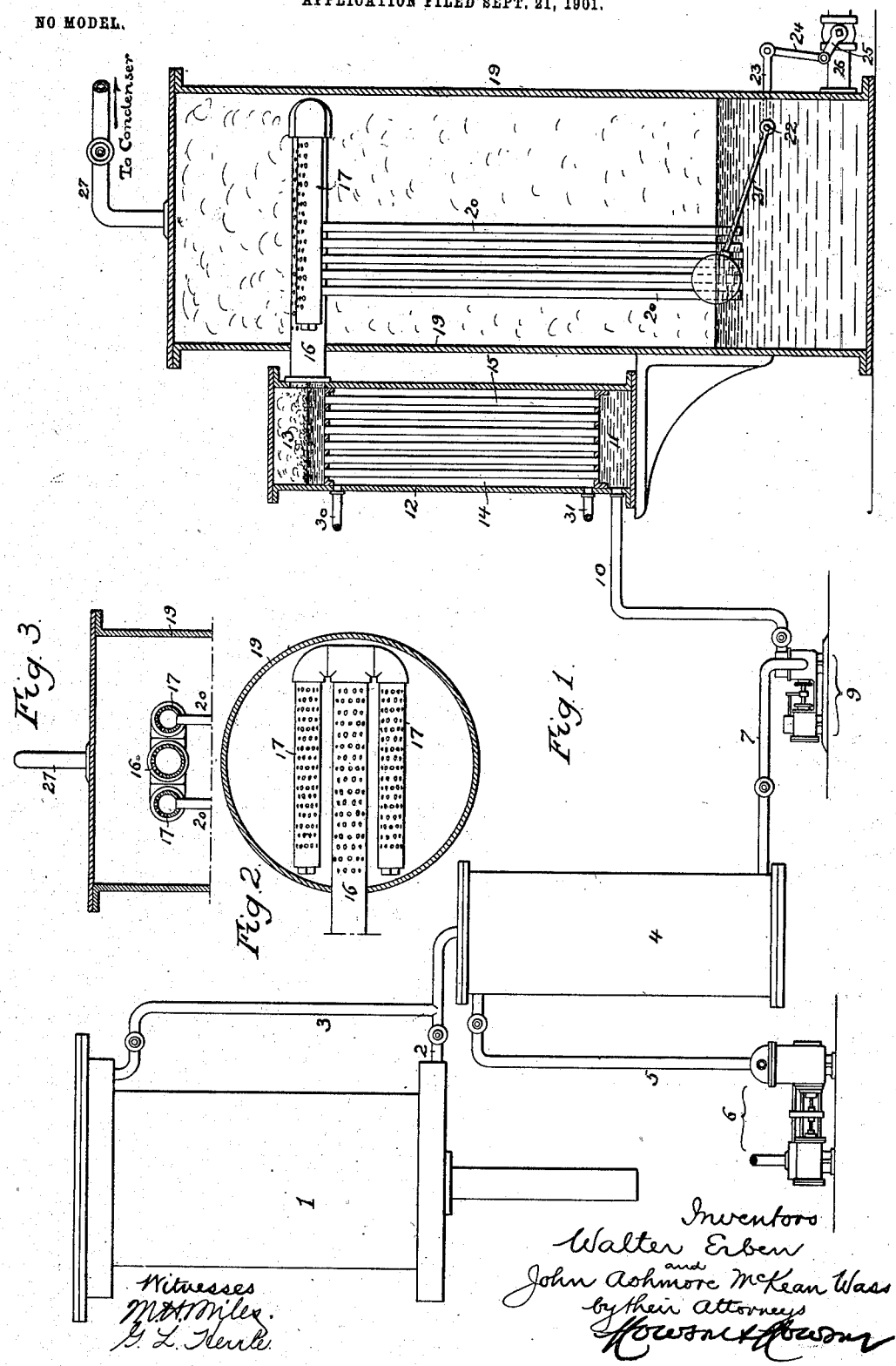

No. 736,240. Patented August 11, 1903.

UNITED STATES PATENT OFFICE.

WALTER ERBEN AND JOHN ASHMORE McKEAN WASS, OF PHILADELPHIA, PENNSYLVANIA; SAID WASS ASSIGNOR TO SAID ERBEN.

APPARATUS FOR SEPARATING VOLATILE LIQUID FROM LIQUID CONTAINING SAME.

SPECIFICATION forming part of Letters Patent No. 736,240, dated August 11, 1903.

Application filed September 21, 1901. Serial No. 76,125. (No model.)

*To all whom it may concern:*

Be it known that we, WALTER ERBEN and JOHN ASHMORE McKEAN WASS, citizens of the United States, and residents of Philadelphia, Pennsylvania, have invented certain Improvements in Apparatus for Separating Volatile Liquid from Liquid Containing Same, of which the following is a specification.

The object of our invention is to provide effective means for separating a volatile liquid from one which is less volatile, and more particularly an improved apparatus for separating the volatile solvent from wash-water used in the processes of extracting grease from wool, for which Walter Erben has obtained previous patents, Nos. 654,529, 654,530, and 669,955.

One advantage of the improved apparatus herein described lies in the fact that the process in which it is employed can be continuously operated, a further advantage being that the said apparatus will effectually separate the solvent from the water without carrying portions of the impure water over with the solvent into the tank or condenser therefor.

In the accompanying drawings, Figure 1 is a diagrammatic representation of apparatus constructed in accordance with our invention. Fig. 2 is a sectional plan view of the separator shown in Fig. 1, taken on the line 2 2; and Fig. 3 is a sectional elevation of the upper portion of the separator, taken on the line 3 3, Fig. 2.

The extracting-keir is represented in the above drawings at 1 and has two valved outlet-pipes 2 and 3, communicating, respectively, with the bottom and top of the keir, so that the wash-water containing solvent can be delivered from either end of said keir. The pipes 2 and 3 discharge into a receiver 4, the upper portion of which is in communication through a valved pipe 5 with an air-pump 6, whereby a partial vacuum can be maintained in said receiver and the flow of fluid from the keir into the receiver thereby induced or facilitated.

The lower portion of the receiver 4 communicates through a valved pipe 7 with the suction end of a pump 9, the discharge end of said pump communicating though a valved pipe 10 with a chamber 11 at the lower end of a heater 12, which has another chamber 13 at its upper end. These two chambers are connected by a series of pipes or tubes 15, the space between the tube-sheets forming a chamber 14, to which steam or other heating agent is admitted through a pipe 30, the waste steam and water of condensation being discharged through a pipe 31 at the bottom of the chamber. From the chamber 13 at the top of the heater a pipe 16 leads into the upper portion of a separator 19, the length of said pipe within the separator having in that portion of the pipe above a horizontal plane passing through its axis a number of relatively small perforations.

As shown in Fig. 2, the end of the pipe 16 is provided with a T, this in turn having connected to it two short nipples provided with elbows pointing backward in the plane of the pipe 16. Each of these elbows has screwed into it a pipe 17 of less area of cross-section than the pipe 16 and having its end farthest from the elbow blanked off or plugged. Like the pipe 16 both of the pipes 17 have their upper halves perforated, and there are depending from the inner portion of each pipe a number of pipes or tubes 20, whose lower ends are sealed by a body of water maintained in the lower portion of the separator 19, the uniform level of this water being secured by means of a float-lever 21, which operates a rock-shaft 22, having an arm 23, connected by a link 24 to an arm 25 on a valve in the drain-pipe 26 of the separator, this valve being opened as soon as the water in the separator rises above the normal level and being closed again as soon as the water falls to said normal level.

In operation the mixture of wash-water and solvent passes from the keir 1 into the receiver 4 and from thence is forced into the lower chamber 11 of the heater 12 by means of the pump 9. Steam or other heating agent is admitted at the top of the chamber 14 and imparts its heat to the mixture rising through the tubes of the heater from the chamber 11 to the chamber 13. The speed of flow of the mixture of wash-water and solvent through the heater is such that it enters the chamber 13 at a temperature sufficient to volatilize any solvent present in the wash-water while still being below the normal boiling-point of the water itself. We have found 200° Fahrenheit a desirable temperature.

Owing to the alkaline soaps usually carried in solution by water which has been used for washing wool, as well as to volatile liquid itself, (usually naphtha,) the heated liquid may enter the pipe 16 in a foaming frothy state. As it flows toward the T at the end of the said pipe a large portion of the naphtha or other volatile solvent is vaporized and passes out of the pipe through the perforations in its upper portion, flowing from the separator through a pipe 27 to a condenser or suitable collecting-tank. The greater part of the solvent still remaining in the wash-water passes off as this hot liquid flows into the pipes 17, while what little still remains is carried down with the wash-water through the relatively long vertical pipes 20, rises through the upper portion of the volume of water in the lower portion of the separator 19, and ascends through said separator from the surface of the water. Whatever tendency the still hot wash-water might have to foam when part of the volatile solvent has been separated from it is overcome by the use of these vertical tubes 20, which separate the said water into a number of comparatively small streams and allow these to fall into the body of water at the bottom of the separator without disturbing it sufficiently to give rise to the objectionable foaming action hitherto experienced in attempting to recover or separate solvent from wash-water.

It will thus be seen that by our improved apparatus we first heat the mixture of wash-water and solvent in a closed vessel to a temperature sufficient to volatilize said solvent and then allow the heated mixture to pass into an open conduit, (in the present instance the pipes 16 and 17 within the separator,) in which the greater part of the solvent separates itself by vaporization from the soapy water and escapes to a condenser without carrying any foam or water with it. The water is then passed through the relatively small vertically-arranged pipes, and as it is discharged from the trapped ends of these pipes it gives up or frees the last remnant of any volatile solvent it may contain.

By means of the float in the separator the water is automatically allowed to pass into a drain as it collects, its level being kept uniform, so as to seal the lower ends of the tubes 20 and prevent agitation or possible disturbance within the separator, which might cause the formation of a body of foam.

The advantage of our improved apparatus over those ordinarily employed or hitherto available to the art is that the operation of separating the solvent from the water can be carried on continuously, and the solvent recovered by the operation is free from any of the impurities contained in the wash-water, although it may in some cases carry with it a small portion of distilled water. Moreover, large volumes of water can be treated at small expense by the use of our apparatus, so that it is commercially profitable to treat water for the recovery of the solvent therefrom, even if the percentage of the latter contained in the water is very small.

Having thus described our invention, we claim and desire to secure by Letters Patent—

1. The combination in apparatus for separating volatile liquid from less volatile liquid in admixture therewith, of a heater whereby the temperature of the mixture can be raised above the vaporizing-point of said volatile liquid, and a substantially horizontal discharge pipe or conduit for said heater located partly above and partly below the liquid-level of the heater, said discharge-pipe having two openings or series of openings, one of said openings or series of openings being so placed in the pipe as to permit of the escape of separated vapor and the other opening or series of openings being placed to permit of the escape of liquid, substantially as described.

2. The combination in apparatus for separating volatile liquid from less volatile liquid in admixture therewith, of a heater having a horizontal discharge-conduit, said discharge-conduit being located partly above and partly below the liquid-level of the heater, there being in said conduit two openings or series of openings, one of said openings or series of openings being formed in the upper portion thereof and the second series being formed in the lower portion, substantially as described.

3. The combination in apparatus for separating volatile liquid from less volatile liquid in admixture therewith, of a heater whereby the temperature of the mixture can be raised above the vaporizing-point of the volatile liquid, and a discharge-conduit for said heater in which the vapor is permitted to separate from the mixture, said conduit having depending tubes for the escape of the liquid, and said tubes being trapped at their lower ends, substantially as specified.

4. The combination in apparatus for separating volatile liquid from less volatile liquid in admixture therewith, of a heater whereby the temperature of the mixture can be raised above the vaporizing-point of the volatile liquid, and a discharge-conduit for said heater in which the vapor is permitted to separate from the mixture, said conduit having openings for the escape of the vapor, and depending tubes for the escape of the liquid, said tubes being trapped at their lower ends, substantially as specified.

5. The combination in apparatus for separating volatile liquid from less volatile liquid in admixture therewith, of a heater whereby the temperature of the mixture can be raised above the vaporizing-point of the volatile liquid, a discharge-conduit for said heater in which the vapor is permitted to separate from the mixture, said conduit having depending trapped pipes for the escape of the liquid, and means for maintaining the level of the trap at a uniform height above the lower ends of the pipes, substantially as specified.

6. The combination in apparatus for separating volatile liquid from less volatile liquid in admixture therewith, of a heater whereby the temperature of the mixture can be raised above the vaporizing-point of the volatile liquid, a discharge-conduit for the heater comprising a central pipe and flanking pipes connected thereto, said pipes having perforated tops and the flanking pipes having depending tubes, a water seal for trapping the lower ends of said depending tubes, and a casing for the separator, substantially as specified.

7. The combination in apparatus for separating volatile liquid from less volatile liquid in admixture therewith, of a heater whereby the temperature of the mixture can be raised above the vaporizing-point of volatile liquid, and a discharge-conduit for said heater in which the vapor is permitted to separate from the mixture, said conduit having depending tubes for the escape of the liquid, substantially as described.

In testimony whereof we have signed our names to this specification in the presence of two subscribing witnesses.

WALTER ERBEN.
JOHN ASHMORE McKEAN WASS.

Witnesses:
F. E. BECHTOLD,
JOS. H. KLEIN.